(12) United States Patent
Fröhlich et al.

(10) Patent No.: US 6,373,144 B2
(45) Date of Patent: Apr. 16, 2002

(54) METHOD AND DEVICE FOR CONTROLLING A PRIME MOVER

(75) Inventors: Johann Fröhlich, Landshut; Hong Zhang, Tegernheim, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/725,344

(22) Filed: Nov. 29, 2000

Related U.S. Application Data (63) Continuation of application No. PCT/DE99/02420, filed on Aug. 19, 1998.

(30) Foreign Application Priority Data

May 29, 1998 (DE) .......................................... 198 24 253

(51) Int. Cl.[7] .............................. F02N 11/06; H02P 9/04
(52) U.S. Cl. ........................ 290/40 R; 290/14; 290/17; 290/40 A; 290/40 B; 290/40 C
(58) Field of Search ...................... 290/17, 40 A–40 D; 123/325

(56) References Cited

U.S. PATENT DOCUMENTS

| | | | | |
|---|---|---|---|---|
| 4,305,254 A | * | 12/1981 | Kawakatsu et al. | ........... 60/716 |
| 4,553,516 A | * | 11/1985 | Hasegawa | ................... 123/339 |
| 5,336,932 A | * | 8/1994 | Barske | ........................ 290/1 R |
| 5,545,928 A | * | 8/1996 | Kotani | ..................... 290/40 C |
| 5,903,061 A | * | 5/1999 | Tsuzuki et al. | ........... 290/40 C |
| 5,907,191 A | * | 5/1999 | Sasaki et al. | .................. 290/19 |
| 6,065,446 A | * | 5/2000 | Engl et al. | ................... 123/325 |

FOREIGN PATENT DOCUMENTS

| | | |
|---|---|---|
| DE | 4133014 A1 | 4/1993 |
| DE | 19612455 A1 | 10/1997 |
| DE | 19633194 A1 | 2/1998 |
| EP | 0788914 A2 | 8/1997 |
| EP | 0830969 A2 | 3/1998 |
| JP | 9-84211 | 3/1997 |

OTHER PUBLICATIONS

Published International Application No. 96/32579 (Treinies et al.), dated Oct. 17, 1996.

* cited by examiner

*Primary Examiner*—Elvin Enad
(74) *Attorney, Agent, or Firm*—Herbert L. Lerner; Laurence A. Greenberg; Werner H. Stemer (57) ABSTRACT

A prime mover has an internal combustion engine and a motor generator. A setpoint of a torque depends on a variable representing the wish of an operator of the prime mover and on operating variables of the internal combustion engine. Actuating signals for actuators of the internal combustion engine depend on the setpoint of the indicated torque. An actuating signal for the motor generator which is arranged on the output shaft of the internal combustion engine depends on the setpoint of the torque.

9 Claims, 6 Drawing Sheets

METHOD AND DEVICE FOR CONTROLLING A PRIME MOVER

CROSS-REFERENCE TO RELATED APPLICATION

This is a continuation of copending international application PCT/DE99/02420, filed Aug. 19, 1998, which designated the United States.

The invention relates to a method of controlling a prime mover which includes an internal combustion engine and wherein a setpoint of a torque depends on a variable representing a driver's wish and operating variables of the internal combustion engine, actuating signals for actuators of the internal combustion engine depend on the setpoint of the torque, and an actuating signal for a motor generator which is arranged on the output shaft of the internal combustion engine depends on the setpoint of the torque. The invention also pertains to a device for controlling a prime mover which includes an internal combustion engine, in which there is provided a device for determining a setpoint of a torque on the basis of a variable representing the driver's wish and operating variables of the internal combustion engine, a device for generating actuating signals for actuators of the internal combustion engine on the basis of the setpoint of the torque, and a device for generating an actuating signal for a motor generator on the output shaft of the internal combustion engine, specifically on the basis of the setpoint of the torque.

A method of controlling an internal combustion engine is disclosed in the commonly assigned, copending patent application Ser. No. 09/160,878 (published as WO 97/36762 and German DE 196 12 455 A1). A setpoint of a torque is determined on the basis of the position of a gas pedal, the rotational speed and further operational variables such as the air mass flow, the coolant temperature and the oil temperature. Depending on the desired torque, a drive signal for a throttle valve actuator is determined. The torque to be set via the air mass flow is determined by taking into account the desired torque and the derivative-action values of the torque, which are required by functions for controlling the internal combustion engine, such as traction control, engine speed limitation, vehicle speed limitation and a catalytic converter heating function. In addition, a setpoint of the torque, which is to be adjusted rapidly, depends on the desired torque and torque requirements of the further functions for controlling the internal combustion engine. An actuating signal for a spark plug depends on the setpoint of the torque. By changing the ignition angle it is possible for the torque actually produced in one cylinder of the internal combustion engine to be changed within one crank shaft segment. The time period of a crank shaft segment is defined, for example, by the time interval between the ignition cycles of two cylinders which are adjacent in the ignition sequence.

Because of the inertia of the intake tract, the setpoint of the torque to be set via the air mass flow can be set only slowly. If the torque which is actually to be generated by the internal combustion engine has excessively high dynamics, then the derivative-action values must be chosen to be high in order to be able to set the torque with a high quality. However, this results in high exhaust gas emissions from the internal combustion engine and high fuel consumption.

SUMMARY OF THE INVENTION

The object of the invention is to provide a device and a method for controlling a prime mover which overcome the above-noted deficiencies and disadvantages of the prior art devices and methods of this kind, and which ensure convenient and simultaneously low-emission operation of the internal combustion engine with a high efficiency of the prime mover.

With the above and other objects in view there is provided, in accordance with the invention, a method of controlling a prime mover having an internal combustion engine, which comprises:

determining a setpoint of a torque in dependence on a variable representing a driver's wish and operating variables of an internal combustion engine;

defining actuating signals for actuators of the internal combustion engine in dependence on the setpoint of the torque;

determining an estimated value of a maximum or minimum torque that can be set via the actuators of the internal combustion engine within a predefined time period; and     defining an actuating signal for a motor generator connected to an output shaft of the internal combustion engine in dependence on the setpoint of the torque and the estimated value of the maximum or minimum torque.

In accordance with an added feature of the invention, the actuator is a spark plug or an injection valve, and the method further comprises determining an estimated value of the actual motor generator torque, and setting an actuating signal for the actuator in dependence on the setpoint of the torque and the estimated value of the actual motor generator torque.

In accordance with an additional feature of the invention, the actuating signal for the motor generator depends on the difference between the setpoint of the torque and the estimated value of the maximum or minimum torque.

In accordance with another feature of the invention, the motor generator as operated as a motor if the estimated value of the maximum torque is less than the setpoint of the torque. The motor generator is operated as a generator if the estimated value of the minimum torque is greater than the setpoint of the torque. Furthermore, the motor generator is operated as a motor if the difference between the setpoint of the torque and the estimated value of the maximum torque is greater than a predefined threshold value.

In accordance with a concomitant feature of the invention, the predefined time period is defined as the time period of one crank shaft segment.

With the above and other objects in view there is also provided, in accordance with the invention, a device for controlling a prime mover having an internal combustion engine, comprising:

a device for determining a setpoint of a torque in dependence on a variable representing a wish of a driver and operating variables of the internal combustion engine;

a device for generating actuating signals for actuators of the internal combustion engine in dependence on the setpoint of the torque;

a device for determining an estimated value of a maximum or minimum torque that can be set via the actuators of the internal combustion engine within a predefined time period; and     a device for generating an actuating signal for a motor generator, arranged on an output shaft of the internal combustion engine, in dependence on the setpoint of the torque and the estimated value of the maximum or minimum torque.

In summary, the objects of the invention are satisfied with the novel method and device which is distinguished by the fact that an actuating signal for a motor generator which is arranged on the output shaft of the internal combustion engine is determined as a function of the setpoint of the torque. The motor generator has a response time which is considerably lower than the time period until a step in the setpoint of the torque is adjusted via the air mass flow. It is therefore possible for the derivative-action value in the torque to be adjusted via the air mass flow to be chosen to be lower without, in the process, having to accept penalties in terms of convenience.

Other features which are considered as characteristic for the invention are set forth in the appended claims.

Although the invention is illustrated and described herein as embodied in a method and device for controlling a prime mover, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Identical and functionally equivalent elements are identified with the same reference symbols throughout the figures.

DESCRIPTION OF THE PREFERRED EMBODIMENTS

Figure 1:
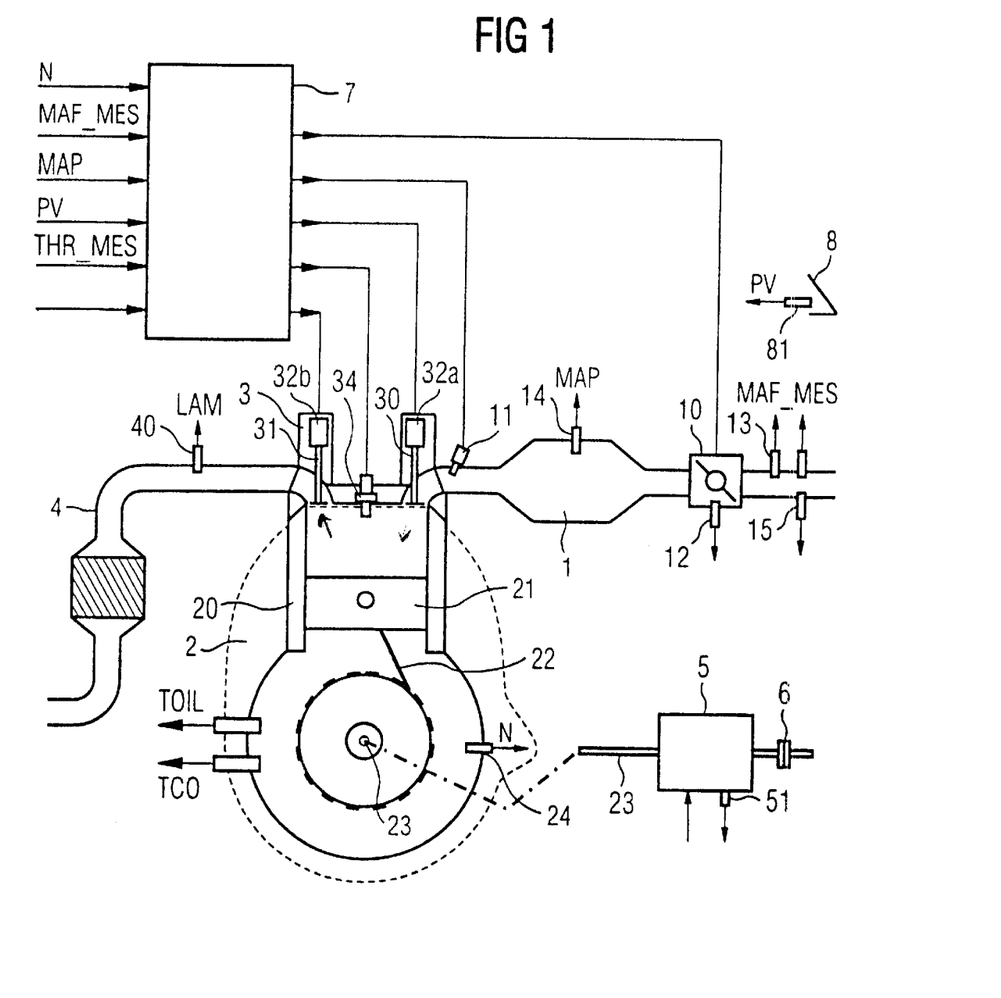
FIG. 1 is a schematic diagram of a prime mover with an internal combustion engine and a motor generator.

Referring now to the figures of the drawing in detail and first, particularly, to FIG. 1 thereof, there is seen a prime mover with an internal combustion engine. The internal combustion engine has an intake tract 1 with a throttle valve 10 and an engine block 2, which has a cylinder 20 and a crank shaft 23. A piston 21 and a connecting rod 22 are associated with the cylinder 20. The connecting rod 22 is connected between the piston 21 and the crank shaft 23.

A cylinder head 3 is provided, in which a valve train is arranged, having at least one inlet valve 30, an outlet valve 31, and in each case a valve drive 32a associated with the inlet valve 30 and a valve drive 32b associated with the outlet valve 31.

Introduced into the intake tract 1 is an injection valve 11, which is arranged in such a way that fuel is metered into the intake tract 1. Alternatively, the injection valve 11 can also be introduced into the cylinder head 3 and be arranged there in such a way that the fuel is metered directly into the interior of the cylinder 20. A spark plug 34 is introduced into a recess in the cylinder head 3. The internal combustion engine is illustrated in FIG. 1 with one cylinder. It will be understood, however, that the engine may comprise a plurality of cylinders.

An exhaust gas tract 4 is associated with the internal combustion engine. A motor generator 5 is provided, whose rotor is connected to the crank shaft 23 by a force fit or power linkage. The motor generator is preferably designed as an asynchronous machine. However, it can also be designed as a synchronous machine or as a DC motor. In motor operation, the crank shaft 23 is the output shaft of the motor generator, and in generator operation it is the drive shaft of the motor generator. The motor generator 5 replaces the starter and the otherwise conventional generator of an internal combustion engine. The prime mover is therefore significantly more compact.

The crank shaft 23 can be coupled via a clutch 6 to a non-illustrated transmission. If the transmission is an automatic transmission, then the clutch 6 is designed, for example, as a torque converter clutch, preferably with a hydrodynamic converter.

A control device 7 controls the prime mover. The control device 7 is assigned sensors which register various measured variables and in each case determine the measured value of the measured variable. Depending on at least one operating variable, the control device 7 determines one or more actuating signals that control an actuator.

The sensors include the following: a pedal position transmitter 81, which registers a pedal position PV of the accelerator pedal 8; a throttle valve position transmitter 12, which registers the degree of opening of the throttle valve; an air mass meter 13, which registers an air mass flow, and/or an intake pipe pressure sensor 14, which registers an intake pipe pressure in the intake tract 1; a first temperature sensor 15, which registers an intake air temperature; a revolution counter 24, which registers the rotational speed N of the crank shaft 23, i.e., the speed of the engine; and a second and third temperature sensor 26, 27, which register an oil temperature TOIL and, respectively, a coolant temperature TCO. Also provided is a measuring unit 51, which registers a characteristic operating variable of the motor generator 5. The characteristic operating variable of the motor generator 5 can be, for example, a current or a voltage or an output. The control device 7 can be assigned any desired subset of the afore-mentioned sensors, but additional sensors can also be assigned here.

Operating variables include measured variables and variables which are derived from the latter, are determined via a characteristic map relationship or by an observer which calculates estimated values of the operating variables.

The actuators each comprise an actuating drive and an actuating element. The actuating drive is an electric motor drive, an electromagnetic drive, a mechanical drive, or any other controlled drive. Such drives are known to those skilled in the art. The actuating elements are designed as a throttle valve 10, as an injection valve 11, as a spark plug 34 or as other actuating elements. These are also known to those skilled in the art of internal combustion engines. When referring to the actuators in the following text, reference will also be had to the respectively associated actuating element.

The control device, in the preferred embodiment, is an electronic engine controller. However, it can also comprise a plurality of control devices which are electrically conductively connected to one another, for example in a bus system.

Figure 2A:
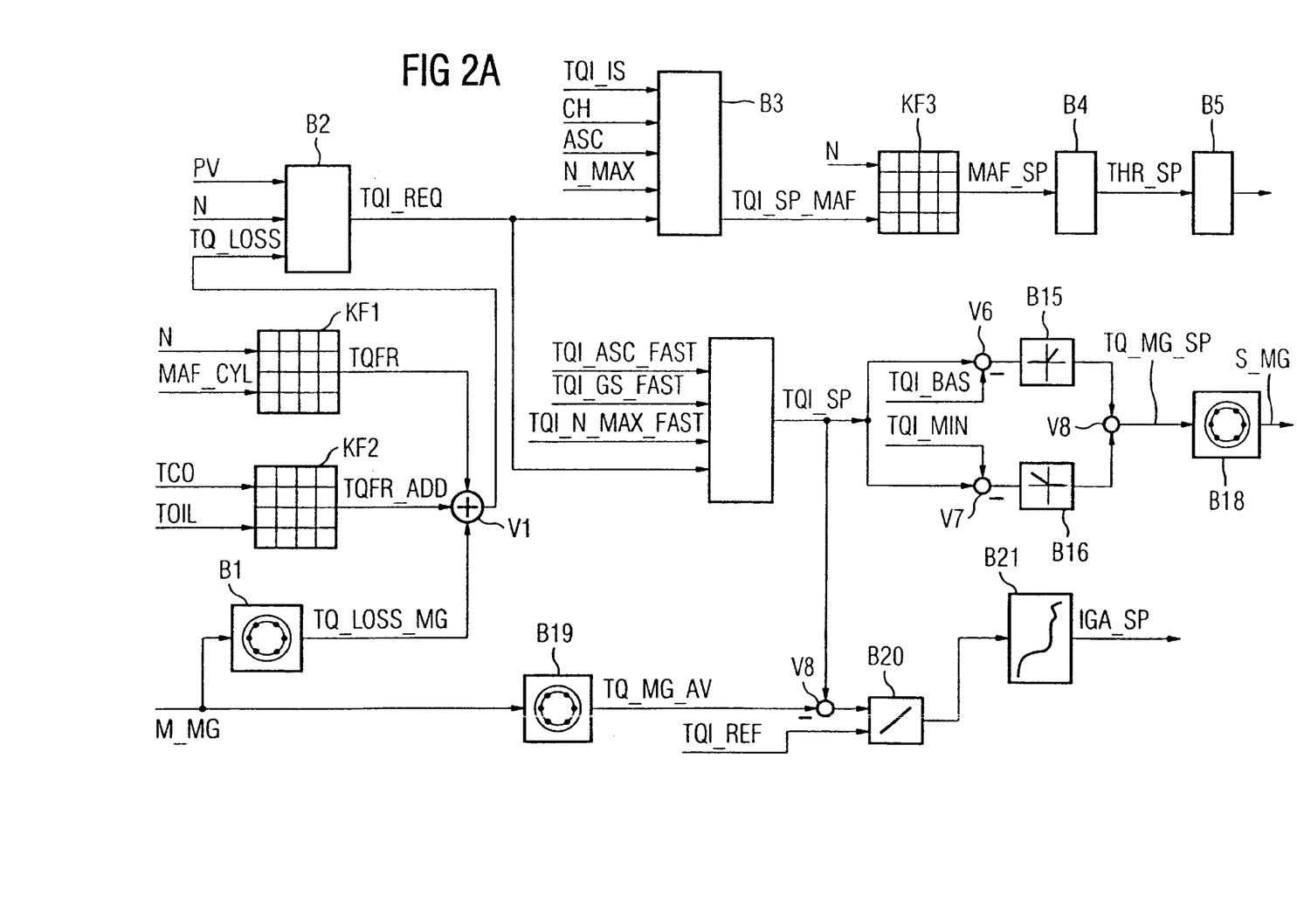
FIGS. 2A, 2B, and 2C are schematic block diagrams of the control system according to the invention.
Figure 2B:
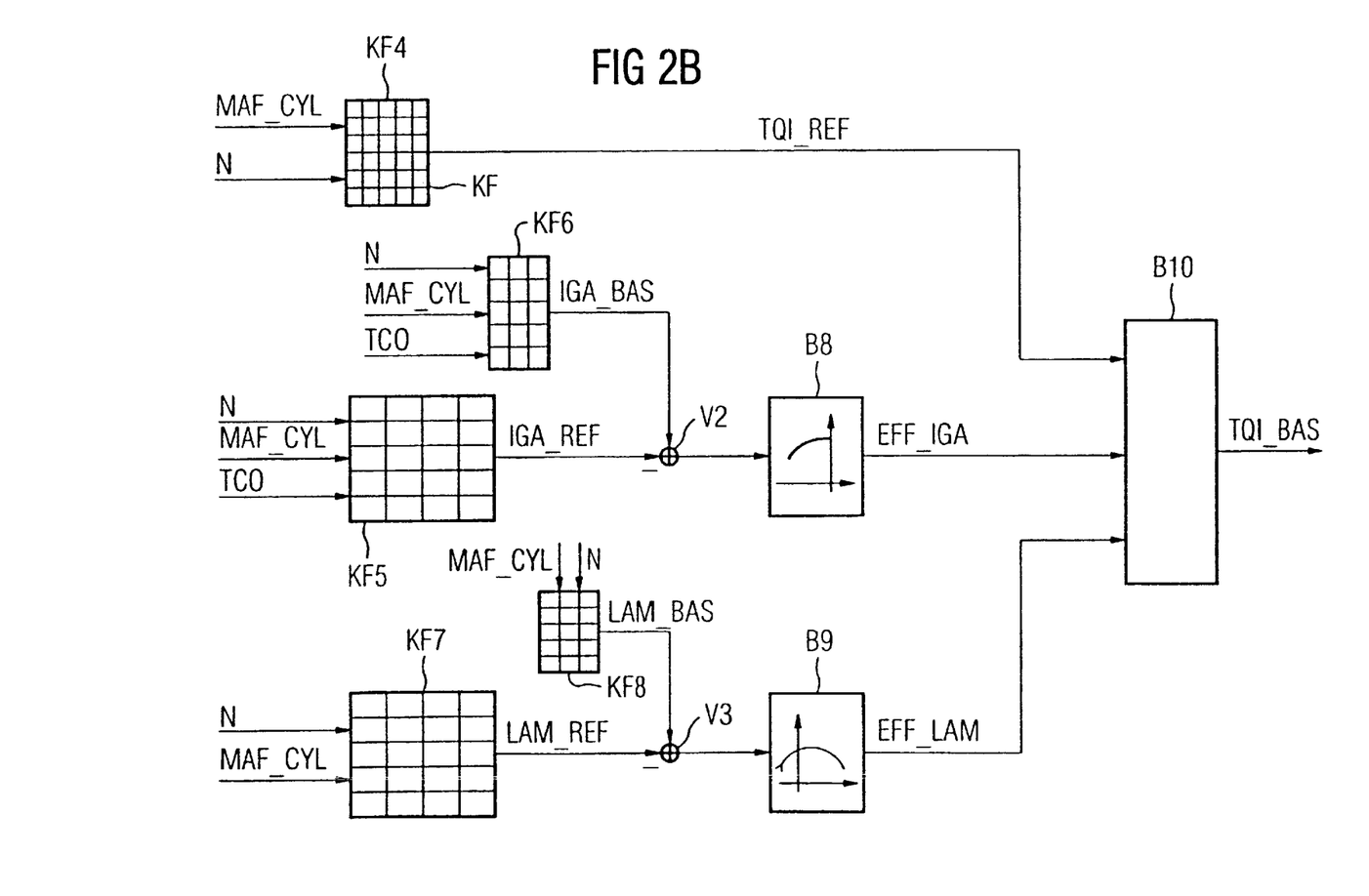
Figure 2C:
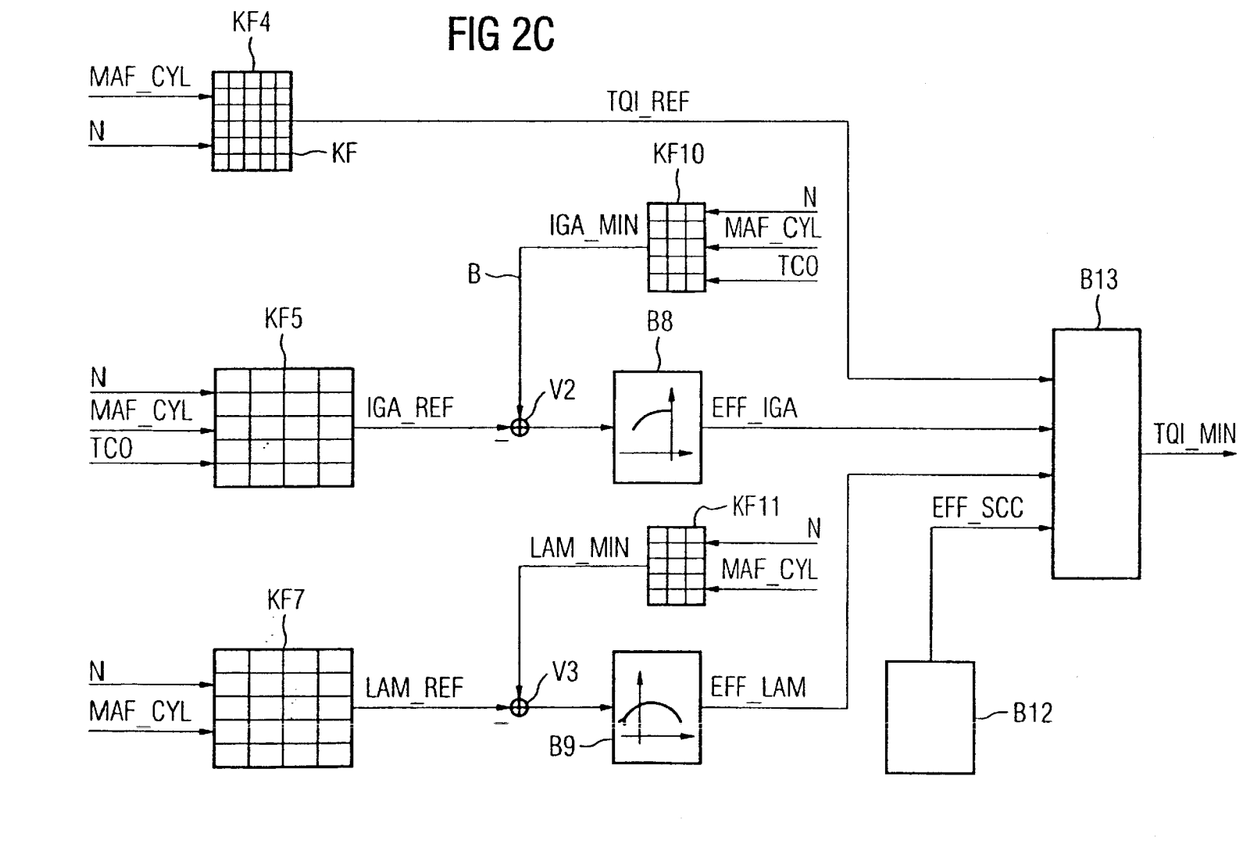

In the following text, the function of the part of the control device 7 that is relevant to the invention will be described with reference to the block diagrams of FIGS. 2A, 2B, 2C. An estimated value MAF_CYL (see FIG. 2A) of the air mass flow into the cylinder 20 is calculated, using a filling model of the intake tract 1, on the basis of the measured value MAF_MES of the air mass flow and further operating variables. A model of that type is disclosed in WO 96/32579, the disclosure of which is hereby incorporated by reference.

A characteristic map KF1 is provided, from which a first contribution TQFR to a torque loss TQ_LOSS is determined on the basis of the rotational speed N and the estimated value MAF_CYL of the air mass flow in the cylinder 20. The first contribution TQFR to the torque loss TQ_LOSS takes account of pump losses in the internal combustion engine and losses which occur as a result of friction given predefined reference values of the coolant temperature TCO and of the oil temperature TOIL.

A second contribution TQFR_ADD to the torque loss TQ_LOSS is determined from a characteristic map KF2 on the basis of the oil temperature TOIL and/or the coolant temperature TCO. In addition, a third contribution TQ_LOSS_MG to the torque loss is determined on the basis of the measured signal M_MG which is generated by the measuring unit 51. The third contribution TQ_LOSS_MG to the torque loss TQ_LOSS is determined in a block B1 via a dynamic model of the losses in the motor generator.

The dynamic model of the losses in the motor generator 5 preferably includes a characteristic curve, in which characteristic values of the third contribution TQ_LOSS_MG are stored as a function of a current registered through the motor generator 5. The characteristic values are corrected with a correction factor which depends on the temperature of the motor generator, this correction factor preferably being subjected to $PD_1$ filtering. The temperature of the motor generator is either determined directly or determined from a characteristic map on the basis of the power fed to or taken from the motor generator. It is preferable if, during the correction of the third contribution TQ_LOSS_MG to the torque loss TQ_LOSS, the intake temperature is also taken into account. The contributions TQFR, TQFR_ADD, TQ_LOSS_MG are added at a linking point V1. Their sum then forms the torque loss TQ_LOSS.

In a block B2, a torque range which can be made available is determined on the basis of the torque loss TQ_LOSS and the rotational speed N. The gas pedal position PV and the rotational speed N are used to determine what proportion of the torque range that can be made available is requested by the driver.

The requested proportion of the torque and the torque which can be made available are then used to determine a value TQI_REQ of the torque which corresponds to the wish of the driver. In this case, filtering of the value TQI_REQ of the torque corresponding to the wish of the driver is preferably also provided, in order to ensure that no load step changes occur which lead to unpleasant jolting of the vehicle in which the prime mover is arranged.

In a block B3, a setpoint TQI_SP_MAF of the torque to be set via the air mass flow is determined. In this case, in addition to the value TQI_REQ of the torque, derivative-action values are taken into account. For example, a derivative-action value TQI_IS is predefined by an idling controller, a derivative-action value TQI_CH is predefined by a function for heating up a catalytic converter, a derivative-action value TQI_ASC is defined by a traction control system, a derivative-action value TQI_N_MAX is predefined by a function for limiting the rotational speed, or a derivative-action value TQI_MSR is provided by an engine drag torque control system. The setpoint TQI_SP_MAF of the torque to be set via the air mass flow can therefore be higher or lower than the value TQI_REQ of the torque which corresponds to the wish of the driver.

By means of a characteristic map KF3, the setpoint TQI_SP_MAF of the torque to be set via the air mass flow is assigned a setpoint MAF_SP of the air mass flow on the basis of the rotational speed N. The values of the characteristic map KF3 are derived from measurements on an engine test bench at a reference air number LAM_REF and at a reference ignition angle IGA_REF, or by means of a simulation calculation.

In a block B4, a setpoint THR_SP of the degree of opening of the throttle valve 10 is determined on the basis of the setpoint MAF_SP of the air mass flow. In a block B5, an actuating signal for driving the throttle valve 10 is determined, preferably of a position controller for the throttle valve 10.

The setpoint TQI_SP_MAF of the torque to be set via the air mass flow takes predictive account of the torque to be set while taking into account the dynamics of the intake tract.

In a block B6, a setpoint TQI_SP is determined of the torque which is to be set within a predefined time period. The predefined time period preferably corresponds to the time period which is determined by a crank shaft segment. A crank shaft segment is determined by the angle between two top-dead-center points of two adjacent cylinders in the ignition sequence or else by the ignition interval between two adjacent cylinders in the ignition sequence. The setpoint TQI_SP of the torque must accordingly be set very quickly, that is to say for example within one operating cycle of the internal combustion engine.

In a block B6, the setpoint TQI_SP of the torque is calculated on the basis of the value TQI_REQ of the torque corresponding to the wish of the driver and the torque requirements TQI_ASC_FAST, TQI_GS_FAST, TQI_N_MAX_FAST of a traction control system, a transmission control system and a function for limiting the rotational speed N. In addition, further torque requirements can also be taken into account.

The determination of an estimated value TQI_BAS of the maximum torque which can be set within the defined time period will be explained below using FIG. 2B. A characteristic map KF4 is provided, from which a reference value TQI_REF of the torque is determined on the basis of the estimated value MAF_CYL and the rotational speed N. The values of the characteristic map KF4 are derived from measurements on an engine test bench at a reference air number LAM_REF and at a reference ignition angle IGA_REF, or are determined by means of a simulation calculation. The reference value TQI_REF of the torque is accordingly in each case the torque which, at the corresponding rotational speed and the corresponding air mass flow into the cylinder, is the maximum which can theoretically be realized if, at the same time, the efficiency EFF_IGA referred to the ignition angle, and the efficiency EFF_LAM referred to the air number are at a maximum.

In a characteristic map KF5, the reference ignition angle IGA_REF is determined on the basis of the rotational speed, the estimated value MAF_CYL of the air mass flow in the cylinder 20 and the coolant temperature TCO.

In a characteristic map KF6, a pareto-optimum basic ignition angle IGA_BAS is determined on the basis of the rotational speed N, the estimated value MAF_CYL of the air mass flow into the cylinder 20 and the coolant temperature TCO.

At a linking point V2, the difference between the basic ignition angle IGA_BAS and the reference ignition angle IGA_REF is formed. In a block B8, the efficiency EFF_IGA of the ignition angle is then determined on the basis of this difference. The efficiency EFF_IGA of the ignition angle is normalized to the efficiency of the ignition angle at the reference ignition angle IGA_REF.

The reference air number LAM_REF is determined from a characteristic map KF7 on the basis of the rotational speed N and the estimated value MAF_CYL of the air mass flow into the cylinder 20. A pareto-optimum basic air number LAM_BAS is determined from a characteristic map KF8 on the basis of the rotational speed N and an estimated value MAF_CYL of the air mass flow into the cylinder 20. At a linking point V3, the difference between the basic air number LAM_BAS and the reference air number LAM_REF is formed and then, in block B9, the efficiency EFF_LAM of the air number is determined, normalized to the efficiency at the reference air number LAM_REF.

In a block B10, the estimated value TQI_BAS of the maximum torque is determined from the product of the reference value TQI_REF of the torque, the efficiency EFF_IGA of the ignition angle and the efficiency EFF_LAM of the air number. The estimated value TQI_BAS of the maximum torque is accordingly the highest value of the torque which can actually be applied by the internal combustion engine at a given estimated value MAF_CYL of the air mass flow into the cylinder 20, the rotational speed N and the coolant temperature. The basic value TQI_BAS of the torque is therefore always less than or equal to the reference value TQI_REF of the torque.

In order to determine an estimated value TQI_MIN (FIG. 2C) of the minimum torque, as distinct from determining the estimated value TQI_BAS of the maximum torque, a minimum ignition angle IGA_MIN is determined from a characteristic map KF10 on the basis of the rotational speed N, the estimated value MAF_CYL and the coolant temperature TCO, and then the difference between the minimum ignition angle IGA_MIN and the reference ignition angle IGA_REF is formed at the linking point V2.

In addition, in a characteristic map KF11, a minimum air number LAM_MIN is determined on the basis of the rotational speed and the estimated value MAF_CYL of the air mass flow into the cylinder 20. The difference between the minimum air number LAM_MIN and the reference air number LAM_REF is then formed at the linking point V3. In addition, in a block B12, a cylinder shutdown efficiency EFF_SCC is determined on the basis of the number of cylinders shut down in overrun operation of the internal combustion engine.

The estimated value TQI_MIN of the minimum torque is then determined in block B13 by forming the product of the reference value of the torque TQI_REF, the efficiency EFF_IGA of the ignition angle, the efficiency EFF_LAM of the air number and the efficiency EFF_SCC of the cylinder shutdown. The estimated value TQI_MIN of the minimum torque is accordingly the lowest value of the torque which can actually be applied by the internal combustion engine at a given estimated value MAF_CYL of the air mass flow into the cylinder 20, the rotational speed N and the coolant temperature.

At a linking point V6 (FIG. 2A), the difference between the setpoint TQI_SP of the torque and the estimated value TQI_BAS of the maximum torque is determined. In a block B15, this difference is limited to a predefined lower threshold value. The lower threshold value can be chosen particularly simply to be equal to zero. It can likewise be chosen to be less than zero or else determined on the basis of the temperature of the motor generator or of the charging level of a voltage supply (battery) of the vehicle in which the prime mover is arranged. It is therefore possible for the availability of the motor generator, that is to say the time between two phases of the motor generator, to be increased in a simple way. Likewise, the charging state of the battery can in this way be kept to a predefined advantageous value.

At a linking point V7, the difference between the setpoint TQI_SP of the torque and the estimated value TQI_MIN of the minimum torque is formed. In a block B16, this difference is then limited to an upper threshold value, which either has the permanently defined value zero or a permanently defined value greater than zero or a value which depends on the temperature of the motor generator 5 or the charging level of the battery.

The sum of the output variables from the blocks B15 and B16 is then formed at a linking point V8 and assigned to a setpoint TQ_MG_SP of the torque to be applied by the motor generator 5. In a block B18, an actuating signal S_MG for the motor generator 5 is then generated via a physical model of the motor generator, on the basis of the setpoint TQ_MG_SP of the torque to be applied by the motor generator, the temperature of the motor generator 5 and the rotational speed N.

The physical model includes, for example, a characteristic curve from which, depending on the setpoint TQ_MG_SP of the torque to be applied by the motor generator 5, the actuating signal S_MG of the motor generator is determined. The actuating signal S_MG of the motor generator 5 is then further corrected by multiplication, depending on a correction value. The correction value is determined from a characteristic map on the basis of the temperature of the motor generator 5 and the rotational speed N and then subjected to $PD_1$ filtering. A model of this type describes the dynamic behavior of the motor generator sufficiently accurately.

The actuating signal S_MG is used to drive the motor generator 5. The actuating signal S_MG can either be a current through the windings of the motor generator 5 or a voltage. The decisive signal parameter is either the amplitude or the frequency of the voltage or of the current.

In the block B19, an estimated value TQ_MG_AV of the torque applied by the motor generator 5 is determined via the physical model of the motor generator, which is the inverse of that described in block B18. In this case, the estimated value TQ_MG_AV of the torque applied by the motor generator is determined on the basis of the measured signal M_MG of the motor generator, which is, for example, the voltage or the current through the motor generator 5.

At a linking point V8, the difference between the setpoint TQI_SP of the torque and the estimated value TQ_MG_AV of the torque actually applied by the motor generator is determined. The difference determined at the linking point V8 accordingly constitutes the proportion of the setpoint TQI_SP of the torque which is not applied by the motor generator 5.

In a block B20, the ratio is determined between the difference determined at the linking point V8 and the reference value TQI_REF of the torque. The ratio is then the input variable to a characteristic curve in a block B21, from which a setpoint IGA_SP of the ignition angle is determined. The spark plug 34 is then driven in accordance with the setpoint IGA_SP of the ignition angle.

The control device 7 is distinguished by the fact that the derivative-action values TQI_IS, TQI_CH, TQI_ASC and TQI_N_MAX can be chosen to be low, since in the event of an actual request for this torque, that is to say with high dynamics of the setpoint TQI_SP, rapid setting can additionally be carried out via the motor generator 5, whose response time is significantly lower than the response time of the intake tract to changes in the throttle valve position.

By means of a suitable choice of the upper and lower threshold values in the blocks B16 and B17, it can additionally be ensured that, even during non steady-state operation of the prime mover, a torque derivative term TQI_CH remains, in order to ensure high exhaust gas temperatures for heating the catalytic converter. Via the motor generator, in each case the change in the torque which cannot be achieved by adjusting the ignition angle can be achieved. Furthermore, precise setting of the setpoint TQI_SP of the torque is carried out via the actuator represented by the spark plug 34. In addition, in the event of negative step changes in the setpoint TQ_SP, the battery of the vehicle can be charged up, instead of a conversion being made into lost heat.

Figure 3:
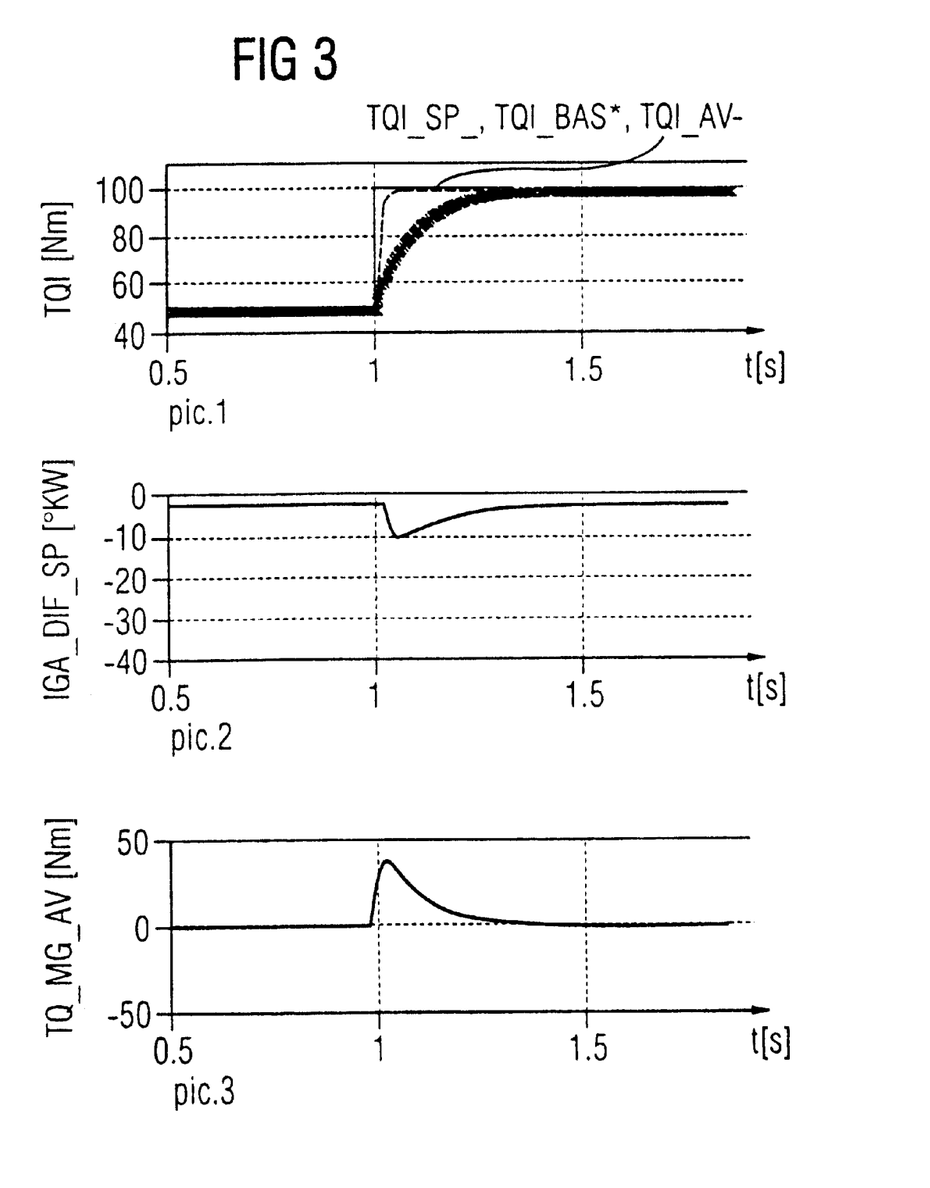
FIG. 3 is a graph plotting signal waveforms over time t.
Figure 4:
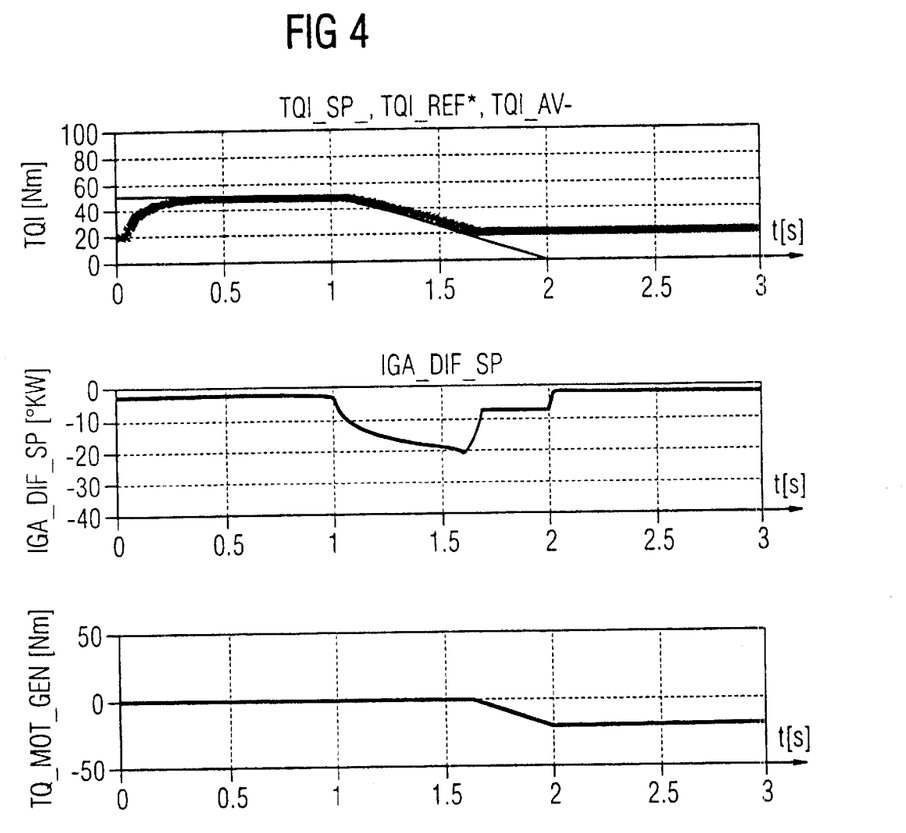
FIG. 4 is a similar graph plotting signal waveforms over time.

FIGS. 3 and 4 are used to illustrate time profiles of the setpoint TQI_SP of the torque in the event of a positive step change in the setpoint TQI_SP, the estimated value TQI_BAS of the maximum torque and an estimated value of a torque actually realized in the internal combustion engine, the difference between the reference ignition angle IGA_REF and the setpoint IGA_SP of the ignition angle and the estimated value TQI_MG_AV of the actual torque applied by the motor generator 5, plotted against the time t. The same variables as in FIG. 3 are also plotted in FIG. 4 against the time t, although here the setpoint TQI_SP of the torque changes, beginning at the time T=1 s, from a steady-state value (50 Nm) to the value 0 Nm. The estimated value TQI_MIN has the value 20 Nm in FIG. 3.

We claim:

1. A method of controling a prime mover having an internal combustion engine with an output shaft for connecting to a transmission, which comprises:
   determining a set point of a torque in dependence on a variable representing a driver's wish and operating variables of an internal combustion engine;
   defining actuating signals for actuators of the internal combustion engine in dependence on the setpoint of the torque;
   determining an estimated value of a maximum or minimum torque that can be set via the actuators of the internal combustion engine within a predefined time period; and
   defining an actuating signal for a motor generator connected to the output shaft of the interal combustion engine in dependence on the setpoint of the torque and the estimated value of the maximum or minimum torque.

2. The method according to claim 1, wherein the actuator is one of a spark plug and an injection valve, and the method further comprises determining an estimated value of the actual motor generator torque, and setting an actuating signal for the actuator in dependence on the setpoint of the torque and the estimated value of the actual motor generator torque.

3. The method according to claim 1, wherein the actuating signal for the motor generator depends on the difference between the setpoint of the torque and the estimated value of the maximum or minimum torque.

4. The method according to claim 1, which comprises operating the motor generator as a motor if the estimated value of the maximum torque is less than the setpoint of the torque.

5. The method according to claim 1, which comprises operating the motor generator as a generator if the estimated value of the minimum torque is greater than the setpoint of the torque.

6. The method according to claim 1, which comprises operating the motor generator as a motor if a difference between the setpoint of the torque and the estimated value of the maximum torque is greater than a predefined threshold value.

7. The method according to claim 1, which comprises defining the predefined time period by a time period of one crank shaft segment.

8. A device for controlling a prime mover having an internal combustion engine with an output shaft for connecting to a transmission, comprising:
   a device for determining a setpoint of a torque in dependence on a variable representing a wish of a driver and operating variables of the internal combustion engine;
   a device for generating actuating signals for actuators of the internal combustion engine in dependence on the setpoint of the torque;
   a device for determining an estimated value of a maximum or minimum torque that can be set via the actuators of the internal combustion engine within a predefined time period; and
   a device for generating an actuating signal for a motor generator, arranged on the output shaft of the internal combustion engine, in dependence on the setpoint of the torque and the estimated value of the maximum or minimum torque, the output shaft being for connecting to a transmission.

9. A device for controlling a prime mover having an internal combustion engine and a motor generator arranged on an output shaft of the internal combustion engine, the output shaft to be connected to a transmission, the device comprising:
   a torque setpoint controller programmed to determine a setpoint of a torque in dependence on a variable representing a driver's wish and operating variables of the internal combustion engine;
   an actuator controller programmed to generate actuating signals for actuators of the internal combustion engine in dependence on the setpoint of the torque;
   an estimator programmed to determine an estimated value of a maximum or minimum torque that can be set via the actuators of the internal combustion engine within a predetermined time period; and
   a motor generator signal generator programmed to generate an actuating signal for a motor generator on an output shaft of the internal combustion engine in dependence on the setpoint of the torque and the estimated value of the maximum or minimum torque.

* * * * *